United States Patent [19]

Aoyama

[11] Patent Number: 4,905,966
[45] Date of Patent: Mar. 6, 1990

[54] SEAT STRUCTURE OF VALVES

[75] Inventor: Minoru Aoyama, Shiga, Japan

[73] Assignee: Okumura Engineering Works Co., Ltd., Shiga, Japan

[21] Appl. No.: 757,738

[22] Filed: Jul. 22, 1985

Related U.S. Application Data

[63] Continuation of Ser. No. 421,326, Sep. 22, 1982, abandoned.

[30] Foreign Application Priority Data

Jan. 18, 1982 [JP] Japan .................................. 57-006513

[51] Int. Cl.⁴ ................................................ F16K 1/22
[52] U.S. Cl. ...................................... 251/173; 251/174
[58] Field of Search ................ 251/172, 173, 174, 306

[56] References Cited

U.S. PATENT DOCUMENTS

| 3,528,448 | 9/1970 | Urban | 251/306 X |
| 3,563,510 | 2/1971 | Priese | 251/173 |
| 3,580,541 | 5/1971 | Bouhot | 251/172 X |
| 4,005,848 | 2/1975 | Eggleston | 251/173 |
| 4,241,895 | 12/1980 | Sternenberg | 257/174 X |
| 4,410,163 | 10/1983 | Scobie | 251/306 |

FOREIGN PATENT DOCUMENTS

| 2396907 | 3/1979 | France | 251/306 |
| 2031124 | 4/1980 | United Kingdom | 251/306 |

Primary Examiner—John Fox
Attorney, Agent, or Firm—Koda & Androlia

[57] ABSTRACT

Seat structure of valves comprising a seat ring, at least one fixing member secured to a valve body and a concave provided between the body and the fixing member for setting the seat ring therein. The seat ring is provided with an inclined contact face to close a flow passage with a close contact with an inclined sealing face of a closure member and a deflective mounting plate to be sandwiched between the body and the fixing member so that the seat ring may be retained movably in response to a flow pressure in the concave both from one direction and from opposite direction of the flow passage. At the opposite side of the contact face, friction face is provided to slidably engage on a corresponding face provided at the fixing member or a substitute therefor. Said face is so inclined as to form a wedge with the inclined sealing face of the closure member.

3 Claims, 10 Drawing Sheets

SEAT STRUCTURE OF VALVES

This is a continuation of application Ser. No. 421,326, filed Sept. 22, 1982 now abandoned.

BACKGROUND OF THE INVENTION

Field of the Invention:

The present invention relates to an improvement of a seat structure of a valve adaptable to various kinds of valves such as butterfly valves, plate valves, etc.

Prior Art:

A seat ring to which a closure member contacts to close flow passage, hithertofore, was generally fixedly mounted to a valve body and unmovable when a flow pressure acted thereupon at a close position of a closure member.

There was also developed a seat ring which had a movable mechanism in a sealing direction under a flow pressure. The movability of a seat ring effected by a flow pressure can enhance the sealing effect attained by the close contact of a closure member with a seat ring.

SUMMARY OF THE INVENTION

This invention relates to the latter type of a valve which has a movable seat ring structure in a sealing direction under a flow pressure, and it is an object of the present invention to provide a movable seat structure of valve which has more improved sealing effect than that of prior arts under a high pressure.

According to the present invention, a seat ring contacting closely with a closure member to close a flow passage is movably mounted to a valve body in such a manner that it moves in response to a flow pressure from both directions, that is, both from one direction and from opposite direction of a flow passage. There is provided with an inclined face at a valve body on which a part of the seat ring slidably contacts. At a close position of a closure member, a frictional face-to-face engagement is attained between the closure member and the seat ring on the one hand, and between the seat ring and the inclined face on the other hand. When a flow pressure acts on the closure member as well as the seat ring, the seat ring slidably moves on the inclined face with a frictional engagement thereto so as to press the seat ring onto the closure member.

It will be understood that the seat ring can be pressed more tightly onto the closure member in accordance with the increase of a flow pressure and attains a complete sealing against a high flow pressure.

BRIEF DESCRIPTION OF THE DRAWINGS

The foregoing object and features of the present invention may be more fully understood from the following detailed description with reference to the accompanying drawings in which:

FIG. 6 is an enlarged cross sectional view of the main part of an embodiment in which the seat structure in accordance with the present invention is adapted to a plate valve.

FIG. 12 is an enlarged cross sectional view of the main part of an embodiment in which the seat structure similar to that shown in FIG. 8 is adapted to a plate valve.

FIG. 16 is a cross sectional view of an enlarged main part illustrating modified mounting construction of the seat ring similar to that shown in FIG. 13, FIG. 17A and 17B are enlarged cross sectional views of the main part of an embodiment in which the seat structure similar to that shown in FIG. 13 is adapted to a plate valve, wherein

DESCRIPTION OF THE PREFERRED EMBODIMENT

Figure 1:
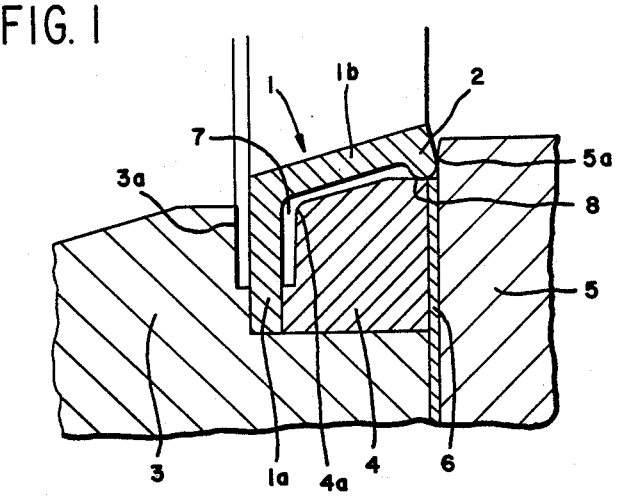
FIG. 1 is an enlarged cross sentional view of a main part illustrating an embodiment wherein the seat structure according to the present invention is adapted to a butterfly valve.

The present invention will be understood readily by reference to the following examples, however, these examples are intended to illustrate the invention and are not to be construed to limit the scope of the invention.

Turning now to the drawings, and particularly FIG. 1 to 4, showing an embodiment for a butterfly valve, reference numeral 1 indicates a metallic seat ring whose shape is roughly inverted letter L in a cross section and annular as a whole. One part of said seat ring serves as a deflective mounting plate 1a and another part is for a contact portion 1b with a closure member. 2 is a projection formed in the same direction as the mounting plate 1a at the free edge of the contact portion 1b. The mounting plate 1a of said seat ring is sandwiched and retained between the body 3 and fixing members at the radially outward end portion with the free inward portion. A split ring 4 and a set ring 5 are used as fixing members in this embodiment. As illustrated, the mounting plate 1a is sandwiched between the body 3 and the split ring 4, and the set ring 5 is fixed to the body 3 by screws. 6 is a gasket preventing fluid from leaking to the outside in the radial direction. A recess 7 is provided between the body 3 and the fixing members, that is, the split ring 4 and the set ring 5 for permitting the deflection of the mounting plate 1a at the free inward portion and the movement of the projection 2 when a flow pressure is exerted on the seat ring 1. The deflection amount of the mounting plate 1a is controlled by the edge 3a of the body 3 and the edge 4a of the split ring 4. The degree of movement of the projection 2 is controlled by the edge 5a of the set ring 5. 8 is the engaging face for the projection 2 provided at the split ring 4 on which the projection 2 slidably contacts and moves with a flow pressure exerted thereon.

Figure 2:
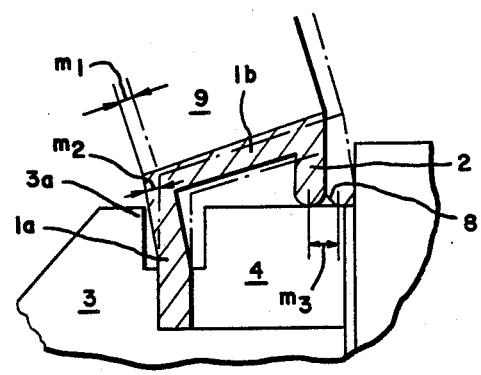
FIG. 2 is a diagrammatic representation showing the sealing action of the seat structure shown in FIG. 1 when the flow pressure acts upon the seat ring from the right side in the drawing.
Figure 3:
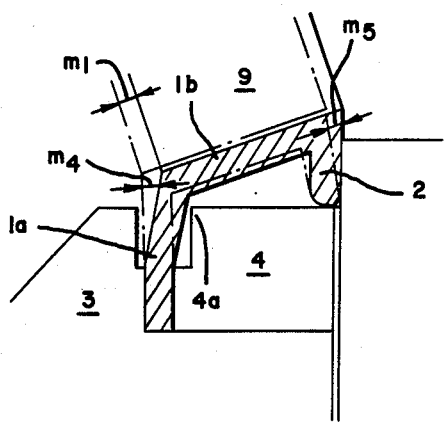
FIG. 3 is a diagrammatic representation showing the sealing action of the same structure shown in FIG. 1 and FIG. 2 when the flow pressure acts upon from the left side in the drawing.

FIG. 2 and FIG. 3 are illustrations describing the sealing action according to the present invention. As shown in FIG. 2, when a flow pressure is exerted from the primary side, that is, from the right side in the drawing, the closure member 9, namely, a valve disc moves to the secondary side, that is, to the left side in the drawing, by the dimensinal tolerance $m_1$ between a stem and a stem inserting hole provided at the closure member. The mounting plate 1a of the seat ring 1 is deflected as shown by $m_2$ and the projection 2 moves by $m_3$ on the engaging face 8. The flow pressure exerted on the projection 2 acts to stand the projection up on the engaging face 8 so as to press the contact portion 1b against a sealing face of the closure member 9, and thus a high sealing condition can be obtained. As the sealing face of the closure member 9 and the contact portion 1b of the seat ring 1 inclines as shown in the drawings and also the engaging face 8 for the projection 2 inclines in the opposite direction with respect to the contact portion 1b as shown in FIG. 1, the movement of the projection 2 by a flow pressure induces a wedging effect between the sealing face of the closure member 9 and the engaging face 8 of the split ring 4. The location of the edge 3a of the body 3 controlling the deflection amount of the mounting plate 1a should be so determined as to cause said wedging effect of the seat ring and prevent the occurence of permanent distortion of the mounting plate 1a.

FIG. 3 shows that a flow pressure is exerted from the secondary side, that is, the left side in the drawing. The closure member 9 moves to the primary side, that is, the right side in the drawing, by the dimensional tolerance $m_1$ between the stem inserting hole and the stem. The mounting plate 1a of the seat ring 1 is deflected by $m_4$, but the projection 2 is prevented from moving by the control of the edge 5a of the set ring 5 and consequently the projection 2 stands up by $m_5$. Accordingly, the contact portion 1b is as much pressed against the sealing face of the closure member 9, thus a preferably sealing condition being obtained. In this case, the deflection amount of the mounting plate 1a is controlled by the edge 4a of the split ring 4.

Figure 4:
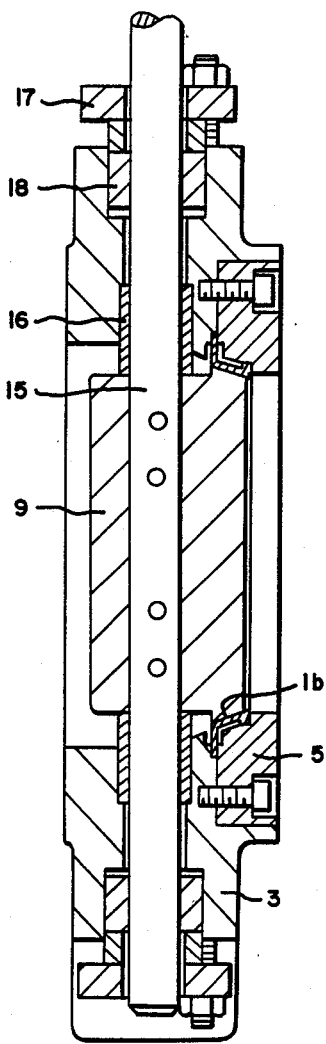
FIG. 4 is a cross sectional general view of a butterfly valve including the above seat structure shown in FIG. 1.

FIG. 4 is an illustration of the general view of a butterfly valve in which the above seat structure is adopted. The same structural members as mentioned above are given the same reference numerals. Of the other numerals, 15 is a stem, 16 being a bearing, 17 being a gland and 18 is a gland packing.

Figure 5:
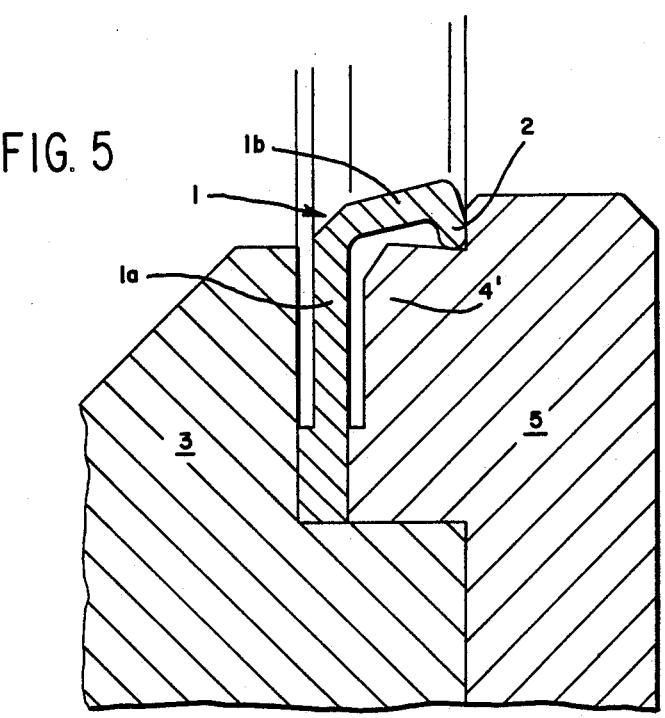
FIG. 5 is a cross sectional view of an enlarged main part illustrating modified mounting construction of the seat ring as an another embodiment of the present invention.

In the above embodiment, the split ring 4 is mounted between the set ring 5 and the body 3, however, the portion corresponding to the split ring 4 can be incorporated with the set ring 5. FIG. 5 illustrates such modification. A seat ring 1 is mounted by sandwiching a mounting plate 1a at the radially outward end portions between a body 3 and a set ring 5 having a portion 4' corresponding to a split ring 4.

Figure 6A:
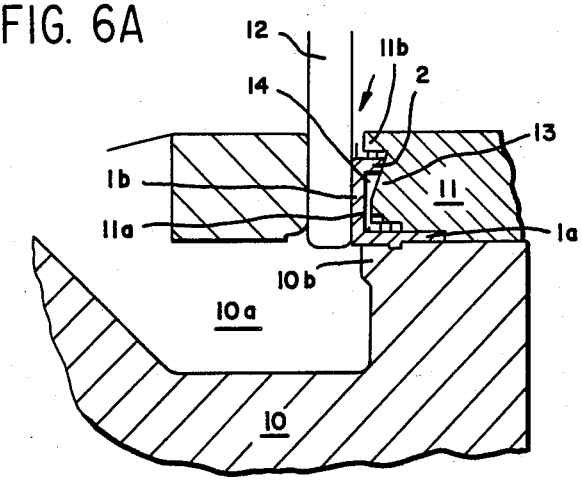
FIG. 6A shows the sealing action of the seat ring when the flow pressure acts upon the seat ring from the right side in the drawing and FIG. 6B shows the sealing action of the seat ring when the flow pressure acts upon from the left side in the drawing.
Figure 6B:
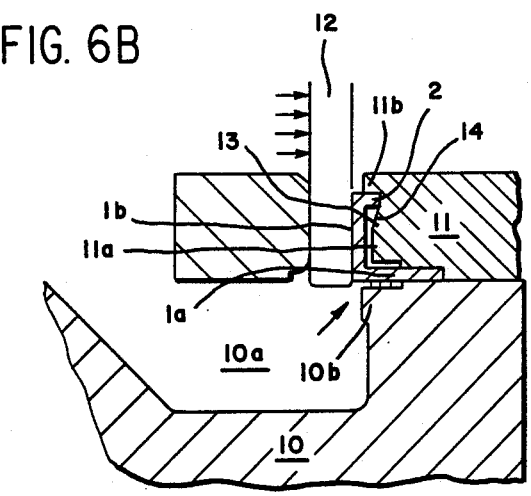

FIGS. 6A, 6B illustrate an enlarged cross sectional view of the main part of an embodiment in which the seat structure in accordance with the present invention is adapted to a plate valve. In the case of a butterfly valve, the contact portion 1b is formed annularly in parallel with the flow passage, whereas in the case of a plate valve, as shown in the figures, the annular contact portion 1b is located on the plane crossing at right angle with the flow passage. The sectional shape of the seat ring is also roughly letter L. One part of the seat ring functions also as a contact portion 1b, and another part thereof is also as a deflective mounting plate 1a. A projection 2 formed in the same direction as the mounting plate 1a is also provided at the free edge of the contact portion 1b. 10 is a body.. 11 is a set ring fixed to the body 10 by screws.

The seat ring 1 is mounted with the mounting plate 1a sandwiched and retained at the axially outward end portion between the set ring 11 and the body 10. 10a are cutouts formed at the body 10 on the circumferencial positions, which pass through the secondary side of the flow passage to the inserting channel of the closure member 12. 13 is a engaging face on which the projection 2 slidably contacts and moves with the action of a flow pressure. 14 is a recess permitting the deflection of the mounting plate 1a and also the movement of the projection 2 by virtue of the deflection of the free inward portion. The deflection amount of the mounting plate 1a is controlled by the edge 10b of the body 10 and the edge 11a of the set ring 11. The amount of movement of the projection 2 is controlled by the other edge 11b of the set ring 11.

When a flow pressure is exerted from the primary side, it also affects on the seat ring 1 in such a direction as shown by the arrow marked in FIG. 6A, causing the projection 2 to stand up like the case of a butterfly valve so as to press the contact portion 1b against the sealing face of the closure member 12. Thus, a preferably sealing condition is obtained.

When a flow pressure is exerted from the secondary side, the closure member 12 itself is pressed strongly against the seat ring 1 and furthermore the flow pressure is also exerted on the seat ring 1 in the arrow direction to press the seat ring against the closure member 12, thus, a very preferable sealing effect being obtained by the above two functions.

Figure 7:
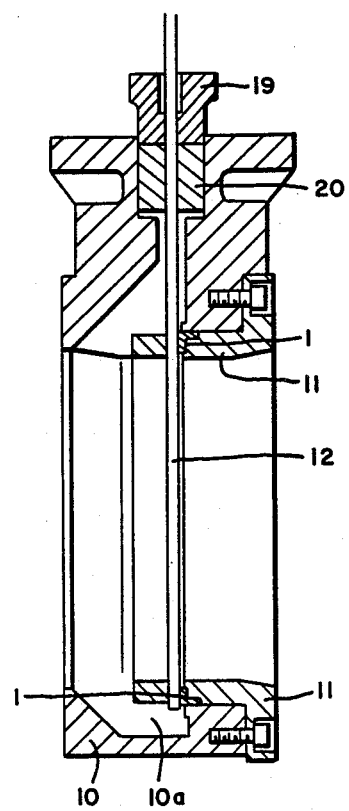
FIG. 7 is a cross sectional general view of a plate valve including the above seat structure shown in FIG. 6.

FIG. 7 is an illustration of the entire structure of a plate valve wherein the above seat structure is adopted. The same structural members as mentioned above are given respectively the same reference numerals. Of the other numerals, 19 shows a gland and 20 shows a gland packing.

In the above embodiments, as a metallic seat ring is employed, there is the availability in a wide range of conditions, i.e., from ultra-low temperature up to ultra-high temperature with ultra-high pressure.

Figure 8:
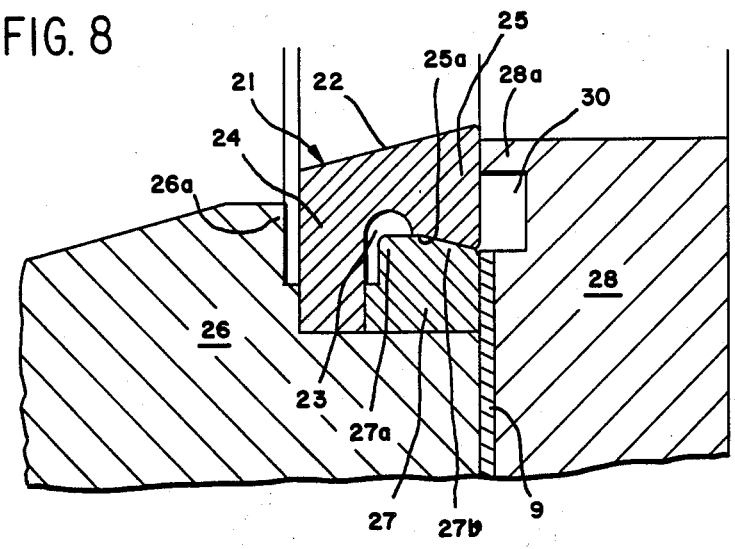
FIG. 8 is an enlarged cross sectional view of a main part illustrating an another embodiment of the seat ring for a butterfly valve according to the present invention.
Figure 9:
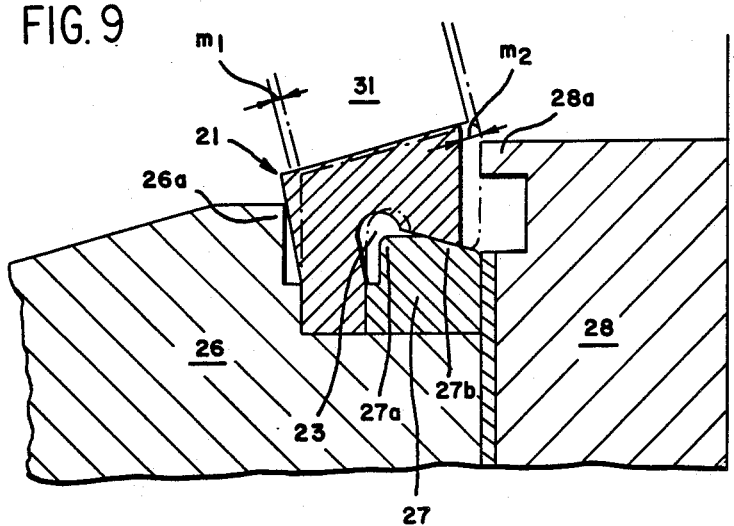
FIG. 9 is a diagrammatic representation showing the sealing action of the seat structure shown in FIG. 8 when the flow pressure acts upon the seat ring from the right side in the drawing.
Figure 10:
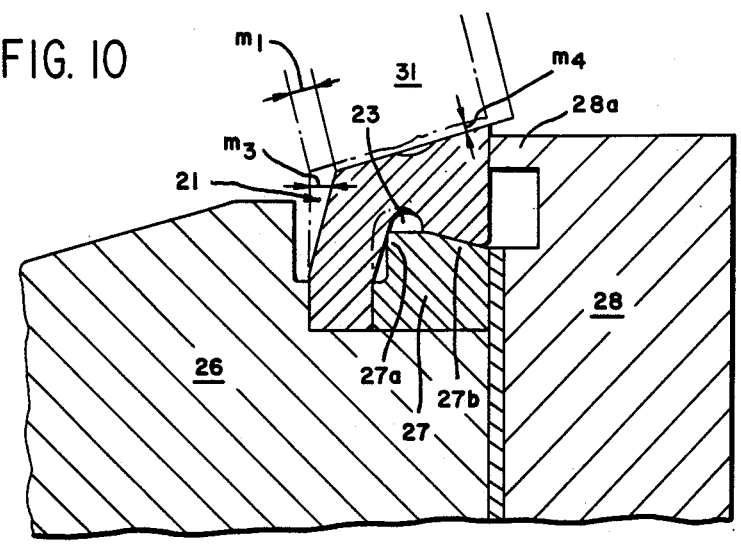
FIG. 10 is a diagrammatic representation showing the sealing action of the same structure shown in FIG. 8 and FIG. 9 when the flow pressure acts upon from the left side in the drawing.

Now reference is made to FIG. 8 to FIG. 10 showing a further modified form of the seat structure for a butterfly valve of the present invention.

Reference numeral 21 indicates a seat ring made of an elastic material such as fluorinated polymer, being shaped in roughly inverted letter L in a cross section and formed annularly as a whole. Said seat ring is provided with, at the back side of a contact face 22 with a closure member, a deflective mounting plate 24 and a friction portion 25 projecting substantially in parallel with said mounting plate 24 with an intermediate groove 23 set therebetween, 27 indicates a split ring and 28 is a set ring fixed to a body 26 by screws. Thus, the seat ring 21 is mounted by sandwiching the mounting plate at the radially outward end portion 24 between the body 26 and the split ring 27. 29 denotes a gasket. Indicated by 30 is a recess permitting the deflection of the mounting plate 24 and the movement of the friction portion 25 by virtue of the deflection of the free inward portion of the seat ring when a flow pressure acts on the seat ring.

The deflection amount of the mounting plate 24 is controlled by the edge 26a of the body 26 and by the edge 27a of the split ring 27. The degree of movement of the friction portion 25 is also controlled by the projecting edge 28a of the set ring 28. The projecting edge 28a has a plurality of cutouts at arbitrary points on the circumference to connect the recess 30 with a flow passage. A friction face 25a of said friction portion 25 is inclined to diminish the thickness of the friction portion toward the mounting plate 24. An engaging face 27b of the split ring 27 on which the friction face 25a slidably contacts is also inclined corresponding to the inclination of the friction face 25a.

FIG. 9 and FIG. 10 are illustrations describing the sealing action according to the above embodiment. As shown in FIG. 9, when a flow pressure is exerted from the primary side, that is, from the right side in the drawing, the closure member 31, namely, a valve disc moves to the secondary side, that is, to the left side in the drawing, by the dimensional tolerance $m_1$ between a stem and a stem inserting hole provided at the closure member. The friction portion 25 of the seat ring 21 moves by $m_2$ on the engaging face 27b and the mounting plate 24 is deflected as shown in the drawing. The groove 23 formed between the mounting plate 24 and the friction portion 25 enhances greatly the movability of the friction portion. The inclination of both the friction face 25a and the engaging face 27b enhances the pressure of the contact face 22 of the seat ring against the sealing face of the closure member 31. Furthermore, as the sealing face of the closure member 31 and the contact face 22 of the seat ring incline as shown in the drawing, the movement of the seat ring 21 produces a wedging effect between the sealing face of the closure member 31 and the engaging face 27b of the split ring 27. As a result, a high sealing effect can be obtained.

FIG. 10 shows that a flow pressure is exerted from the secondary side. The closure member 31 moves to the primary side by the dimensional tolerance $m_1$ between the stem inserting hole and the stem. The mounting plate 21a of the seat ring 21 is deflected by $m_3$, but the friction portion 25 is prevented from moving by the projecting edge 28a. Accordingly, a high sealing effect can be obtained between the contact face 22 and the sealing face of the closure member 31 in proportion to the amount of movement of the closure member, when the deflection amount of the mounting plate 24 is suitably set by the position of the edge 27a of the split ring 27. $m_4$ is the interference of the contact face 22 at the circumference thereof which corresponds to the amount of movement of the closure member 31.

Figure 11:
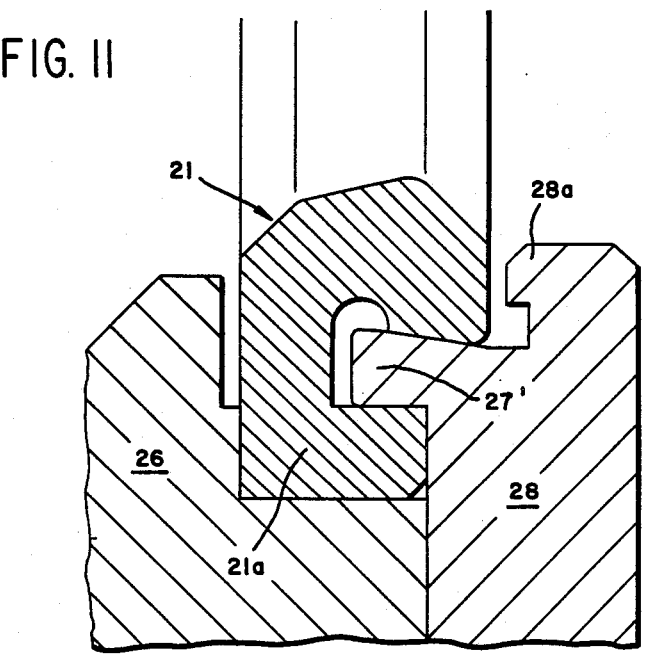
FIG. 11 is a cross sectional view of an enlarged main part illustrating modified mounting construction of the seat ring similar to that of the embodiment shown in FIG. 8.

FIG. 11 shows a modified form wherein the split ring 27 in the above embodiment is substituted by the corresponding portion 27' of the set ring 28. A seat ring 21 is mounted by to sandwiched a mounting plate 21a at the radially outward end portions between a body 26 and a set ring 28.

Figure 12A:
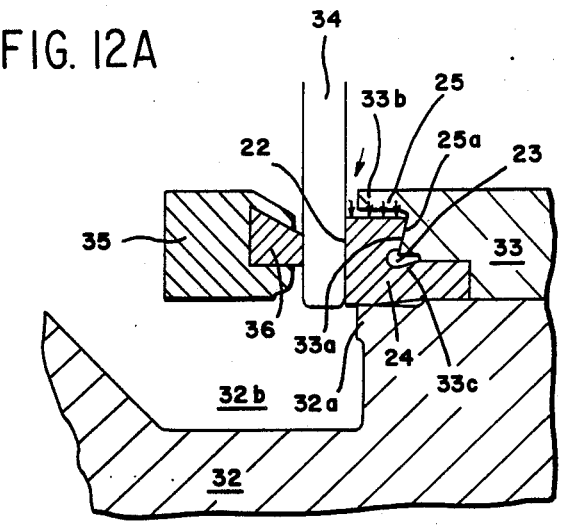
FIG. 12A shows the sealing action of the seat ring when the flow pressure acts upon the seat ring from the right side in the drawing and FIG. 12B shows the sealing action of the seat ring when the flow pressure acts upon from the left side in the drawing.
Figure 12B:
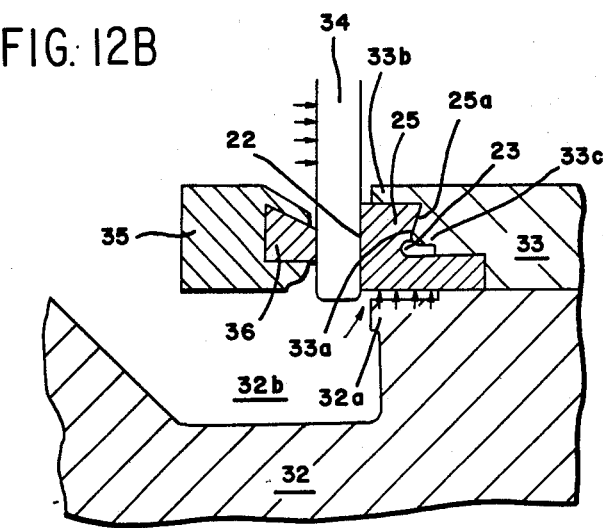

FIG. 12A and 12B illustrate an enlarged cross section of the main part of an embodiment in which a similar seat ring 21 is adapted to a plate valve. The annular contact face 22 is located on the plate crossing at right angle with the flow passage. Said seat ring is also provided with at the back side of a contact face 22 a deflective mounting plate 24 and a friction portion 25 projecting substantially in parallel with said mounting plate 24 with an intermediate groove 23 set therebetween. 32 indicates a body. 33 denotes a set ring fixed to the body 32 by screws. The seat ring is mounted with the mounting plate 24 sandwiched and the axially outward end portion between the body 32 and the set ring 33. A friction face 23a and an engaging face 33a are inclined in like manner as mentioned in the embodiment in accordance with FIGS. 8 to 11. The amount of movement of the friction portion 25 is controlled by a projecting edge 33b of the set ring 33 while the deflection amount of the mounting plate 24 is controlled by an edge 32a of the body 32 and an edge 33c of the set ring 33. In other words, the projecting edge 33b, the edges 32a and 33c restrict a recess to set the seat ring 21. 32b are cutouts formed at the body 32 on the circumferencial portions, which pass through the secondary side of the flow passage to the inserting channel of the closure member 34. 35 is a support ring screwed to the inside face of the body at the secondary side of the flow passage. Screwed to the support ring 35 is a press ring 36 made from fluorinated polymer to which the closure member 34 is pressed.

FIG. 12A shows that a flow pressure is exerted on the seat ring 21 from the primary side as shown by the arrow. Due to the deflection of the mounting plate 24 and the movement of the friction portion 25 by virtue of the deflection of the free inward portion on the engaging face 33a, the contact face 22 of the seat ring 21 is pressed onto the sealing face of the closure member 34, thus a preferable sealing effect can be obtained.

FIG. 12B shows that a flow pressure is exerted on the seat ring 21 from the secondary side as shown by the arrow. The closure member 34 is pressed strongly onto the contact face 22 of the seat ring 21 and furthermore the flow pressure is also exerted on the seat ring 21 to press it onto the closure member 34, thus a very preferable sealing effect being obtained by the above two functions.

Figure 13:
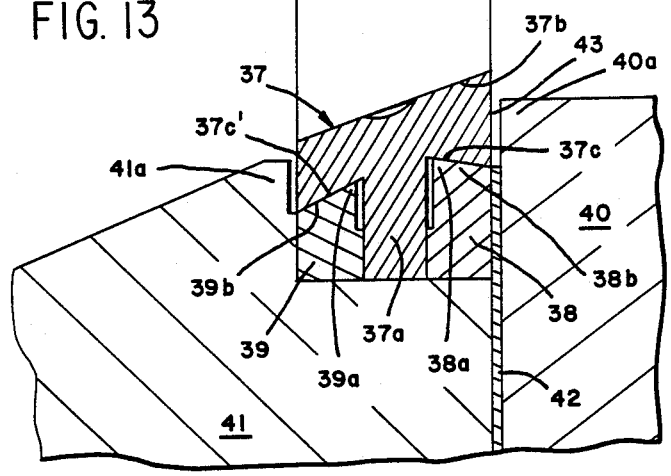
FIG. 13 is an enlarged cross sectional view of a main part illustrating a further modified form of a seat ring for a butterfly valve according to the present invention.
Figure 14:
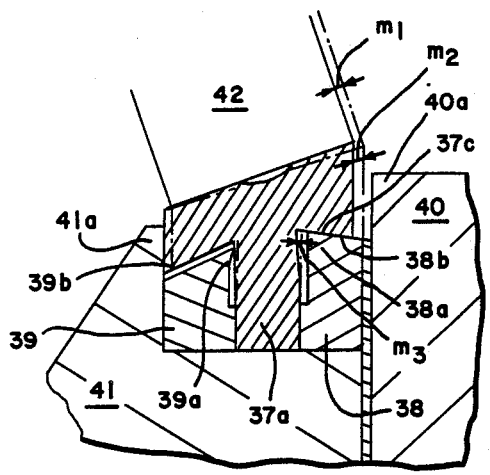
FIG. 14 is a diagrammatic representation showing the sealing action of the seat structure shown in FIG. 13 acts upon the seat ring from the right side in the drawing.
Figure 15:
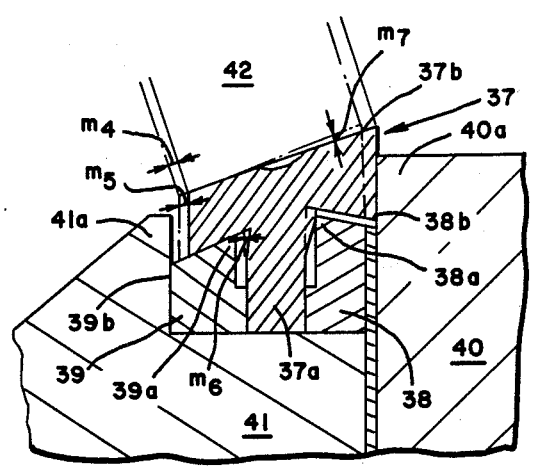
FIG. 15 is a diagrammatic representation showing the sealing action of the same structure shown in FIG. 13 and FIG. 14 when the flow pressure acts upon from the left side in the drawing.

Now reference is made to FIG. 13 to FIG. 15 which shows further modified form of the seat structure for a butterfly valve of the present invention.

Reference nemeral 37 indicates a seat ring made of an elastic material such as fluorinated polymer, being shaped in roughly letter T in a cross section and formed annularly as a whole. A longitudinal portion of letter T is a deflective mounting plate 37a and the upper face of a tranverse portion of letter T is a contact face 37b. Two lower faces of the transverse portion divided by the longitudinal portion are friction faces 37c and 37c'. 38 and 39 indicate split rings and 40 is a set ring fixed to a body 41 by screws. The seat ring 37 is mounted by sandwiching the mounting plate 37a at the radially outward end portion between both split rings 38, 39 which are secured to the body 41 by the set ring 40. 42 denotes a gasket. Indicated by 43 is a recess permitting the deflection of the mounting plate 37a and the movement of the friction faces 37c, 37c' of the seat ring by virtue of the deflection of the free inward portion when a flow pressure acts on the seat ring. The deflection amount of the mounting plate is controlled by the edge 38a, 39a of the split rings 38, 39 and the amount of movement of the friction faces 37c, 37c' is also controlled by the edge 41a of the body 41 and the edge 40a of the set ring 40. The friction faces 37c, 37c' are inclined to diminish the thickness of the transverse portion of letter T respectively toward the mounting plate 37a. Engaging faces 38b, 39a of the split rings 38, 39 on which the friction faces 37c, 37c' slidably contact are also inclined respectively corresponding to the inclination of the friction faces 37c, 37c'.

FIG. 14 and FIG. 15 are illustrations describing the sealing action according to the above embodiment. As shown in FIG. 14, when a flow pressure is exerted from the primary side, the closure member 42, namely a valve disc moves to the secondary side by the dimensional tolerance $m_1$ between a stem and a stem inserting hole provided at the closure member. The friction faces 37c, 37c' of the seat ring 37 moves by $m_2$ on the engaging faces 38b, 39b and the mounting plate 37a is deflected as shown by $m_3$. The inclination of the friction faces 37c, 37c' and the engaging faces 38b, 39b enhance the pressure of the contact face 37b of the seat ring against the sealing face of the closure member 42. Furthermore, as the sealing face of the closure member 42 and the contact face 37b of the seat ring incline as shown in the drawing, the movement of the seat ring 37 produces a wedging effect between the sealing face of the closure member 42 and the engaging faces 38b, 39b of the split rings 38, 39. As a result, a high sealing effect can be obtained.

FIG. 15 shows that a flow pressure is exerted from the secondary side. The closure member 42 moves to the primary side by the dimensional tolerance $m_4$ between the stem inserting hole and the stem. The friction faces 37c, 37c' of the seat ring moves by $m_5$ on the engaging faces 38b, 39b and the mounting plate 37a is deflected as shown by $m_6$. The flow pressure exerted on the seat ring acts to press the contact face 37b against the sealing face of the closure member 42 so that a high sealing effect is obtained between the contact face 37b and the sealing face of the closure member 42. Furthermore the movement of the seat ring produces a wedging effect between the sealing face of the closure member 42 and the corresponding inclining friction face 39b, thus the sealing effect being as much great. $M_7$ is the interference of the seat ring at the circumference thereof which is induced by the movement of the member.

Figure 16:
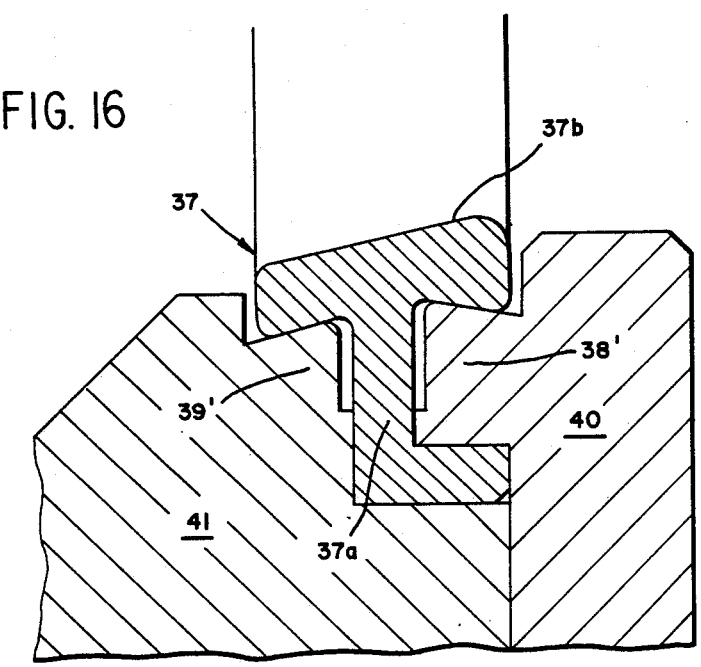

FIG. 16 shows a modified form wherein the split rings 38, 39 in the above embodiment are substituted by the corresponding portions 38, 39' of the set ring 40 and the body 41 respectively. A seat ring 37 is mounted by sandwiching a mounting plate 37a as the radially outward end portion between the body 41 and a set ring 40.

Figure 17A:
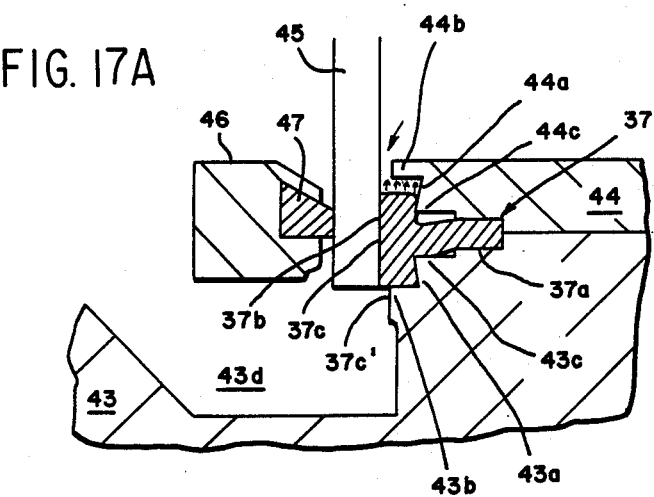
FIG. 17A shows the sealing action of the seat ring when the flow pressure acts upon the seat ring from the right side in the drawing and FIG. 17B shows the sealing action of the seat ring when the flow pressure acts upon from the left side in the drawing.
Figure 17B:
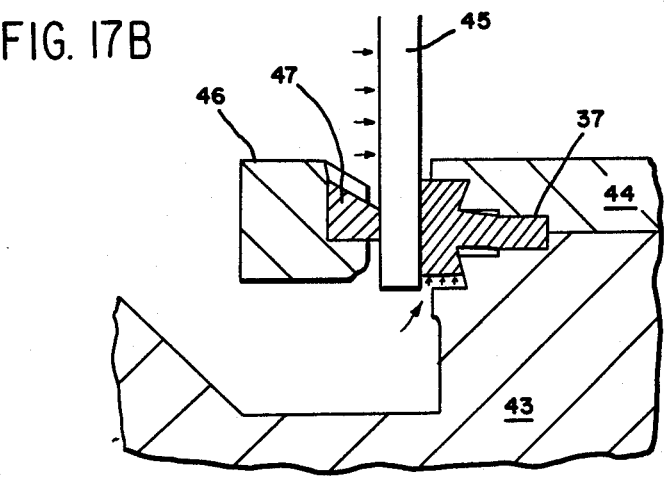

FIGS. 17A and 17B illustrate an enlarged cross section of the main part of an embodiment in which a similar seat ring 37 is adapted to a plate valve. The annular contact face 37b is located onthe plane crossing at right angle with the flow passage. The seat ring 37 is also made of an elastic material such as fluorinated polymer being shaped in roughly letter T in a cross section and formed annularly as a whole. A longitudinal portion of letter T is deflective mounting plate 37a and the upper face of a transverse portion of letter T is a contact face 37b. Two lower face of the transverse portion divided by the longitudinal portion are friction faces 37c and 37c'. 43 indicates a body and a set ring 44 is fixed thereto by screws. The seat ring 37 is mounted by sandwitching a mounting plate 37a at the axially outward end portion between the body 43 and the set ring 44. Friction faces 37c, 37c' are inclined to diminish the thickness of the transverse portion of letter T respectively toward the mounting plate 37a. Engaging faces 43a of the body 43 and 44a of the set ring 44 on which the friction faces 37c, 37c' slidably contact are also inclined respectively corresponding to the inclination of the friction faces 37c, 37c'.

The amount of movement of the friction faces 37c, 37c' is controlled by a projecting edge 44b of the set ring 44 and an edge 43b of the body 43 while the deflection amount of the mounting plate 37a is controlled by an edge 44c of the set ring. In other words, the projecting edge 44b, the edges 43b, 43c and the edge 44c restrict the concave to set the seat ring therein.

43d are cutouts formed at the body 43 on the circumferential portions, which pass through the secondary side of the flow passage to the inserting channel of the closure member 45. 46 is a support ring screwed to the inside face of the body at the secondary side of the flow passage. Secured to the support ring 46 is a press ring 47 made from fluorinated polymer to which the closure member 45 is pressed.

FIG. 17A shows that a flow pressure is exerted on the seat ring 37 from the primary side as shown by the arrow. Due to the deflection of the mounting plate 37a and the movement of the friction faces 37c, 37c' on the engaging faces 43a, 44a, the contact face 37b of the seat ring 37 is pressed onto the sealing face of the closure member 45, thus a preferable sealing effect can be obtained.

FIG. 17B shows that flow pressure is exerted on the seat ring 37 from the secondary side as shown by the arrow. The closure member 45 is pressed strongly onto the contact face 37b of the seat ring 37 and furthermore the flow pressure is also exerted on the seat ring 37 to press it onto the closure member 45, thus a very preferable sealing effect being obtained by the above two functions.

Figure 18:
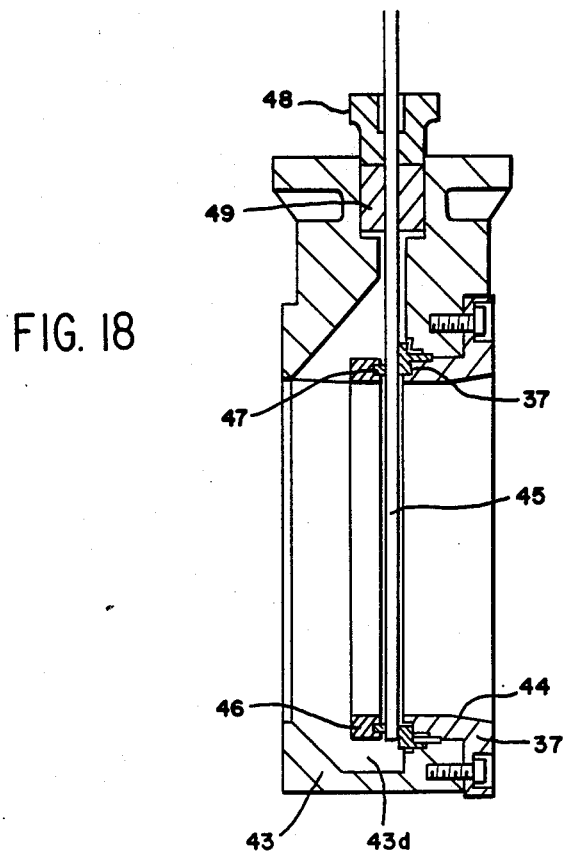
FIG. 18 is a cross sectional general view of a plate valve including the above seat structure shown in FIGS. 17A and 17B.

FIG. 18 is an illustration of the entire structure of a plate valve wherein the above seat structure is adopted. The same structural members as mentioned above are given respectively the same reference numerals. Of the other numerals, 48 shows a gland and 49 shows a gland packing.

What is claimed is:

1. A seat valve structure for a valve comprising a seat ring, at least one fixing member secured to a valve body and a recess provided between the body and the fixing member for setting the seat ring therein, said seat ring being annular as a whole and being provided with an inclined contact portion for closing a flow passage when brought into close contact with an inclined sealing face of a closure member at a closed position thereof, a deflective mounting plate to be sandwiched between the body and the fixing member secured thereto at an outward end portion of said deflective mounting plate with a free inward portion of the deflective mounting plate remaining in the recess for retaining the seat ring movably with a flow pressure in the recess by virtue of the deflection of the free inward portion and at least one friction face at the opposite side of the contact face, which slidably engages on a corresponding engaging face provided at the fixing member for sliding movement of said friction face in response to said flow pressure, said engaging face being so inclined in a cross direction relative to the inclination of the sealing face of the closure member as to form a wedge with the inclined sealing face of the closure member at a closed position thereof and wherein said seat ring further being formed from a metallic material roughly in inverted letter L in a cross section, on part thereof corresponding to the longitudinal portion of the letter L being taken for said deflective mounting plate, another part thereof corresponding to the transverse portion of the letter L being taken for said contact portion for closing said flow passage when brought into close contact with the inclined sealing face of the closure member and for a friction portion slidably engaging on the corresponding inclined engaging face provided at the fixing member, a projection being formed at a free edge of the transverse portion of the letter L in a direction substantially parallel to the mounting plate, said deflective mounting plate further characterized in that said deflective mounting plate is straight, said outward end portion of the deflective mounting plate is thicker than said free inward portion of the deflective mounting plate a length of the contact portion, a length of the friction portion and a length of the free inward portion is longer than a length of the outward end portion.

2. A seat valve structure for a valve comprising a seat ring, at least one fixing member secured to a valve body and a recess provided between the body and the fixing member for setting the ring therein, said seat ring being annular as a whole and being provided with an inclined contact face to close a flow passage with a close contact with an inclined sealing face of a closure member at a closed position thereof, a deflective mounting plate to be sandwiched between the body and the fixing member secured thereto at an outward end portion of said defective mounting plate with a free inward portion of said deflective mounting plate remaining in the recess for retaining the seat ring movably with a flow pressure in the recess by virtue of the deflection of the free inward portion and at least one friction face at the opposite side of the contact face, which slidably engages on a corresponding engaging face provided at the fixing member for sliding movement of said friction face in response to said flow pressure, said engaging face being so inclined in a cross direction relative to the inclination of the sealing face of the closure member as to form a wedge with the inclined sealing face of the closure member at a closed position thereof and wherein said seat ring further being formed from an elastic material roughly in inverted letter L in a cross section, on part thereof corresponding to the longitudinal portion of the letter L being taken for said deflective mounting plate, another part thereof having the contact face to close a flow passage with the inclined sealing face of the closure member and the friction face slidably engaging on the corresponding inclined engaging face provided at the fixing member being provided at a friction portion projecting substantially in parallel with the mounting plate with an intermediate of a groove formed between the mounting plate and said friction portion.

3. A seat valve structure for a valve comprising a seat ring, at least fixing member secured to a valve body and a recess provided between the body and the fixing member for setting the seat ring therein, said seat ring being annular as a whole and being provided with an inclined contact face to close a flow passage with a close contact with an inclined sealing face of a closure member at a closed position thereof, a deflective mounting plate to be sandwiched between the body and the fixing member secured thereto at an outward end portion with an free inward portion remaining in the recess for retaining the seat ring movably with a flow pressure in the recess by virtue of the deflection of the free inward portion and at least one friction face at the opposite side of the contact face, which slidably engaged on a corresponding engaging face provided at the fixing member for sliding movement of said friction face in response to said flow pressure, said engaging face being so inclined in a cross direction relative to the inclination of the sealing face of the closure member as to form a wedge with the inclined sealing face of the closure member at a closed position thereof and wherein said seat ring further being made from an elastic material roughly in letter T in a cross section, a longitudinal portion of said letter T being taken for the deflective mounting plate, a transverse portion of said letter T having the contact face to close a flow passage with the inclined sealing face of the closure member at the upper face thereof and friction faces slidably engaging on the corresponding inclined engaging faces provided at the fixing member at lower faces thereof divided by the transverse portion thereof.

* * * * *